W. F. SCHALLER.
PROCESSING MACHINE FOR FRUITS AND VEGETABLES.
APPLICATION FILED MAR. 13, 1920.
1,381,347.
Patented June 14, 1921.
4 SHEETS—SHEET 1.
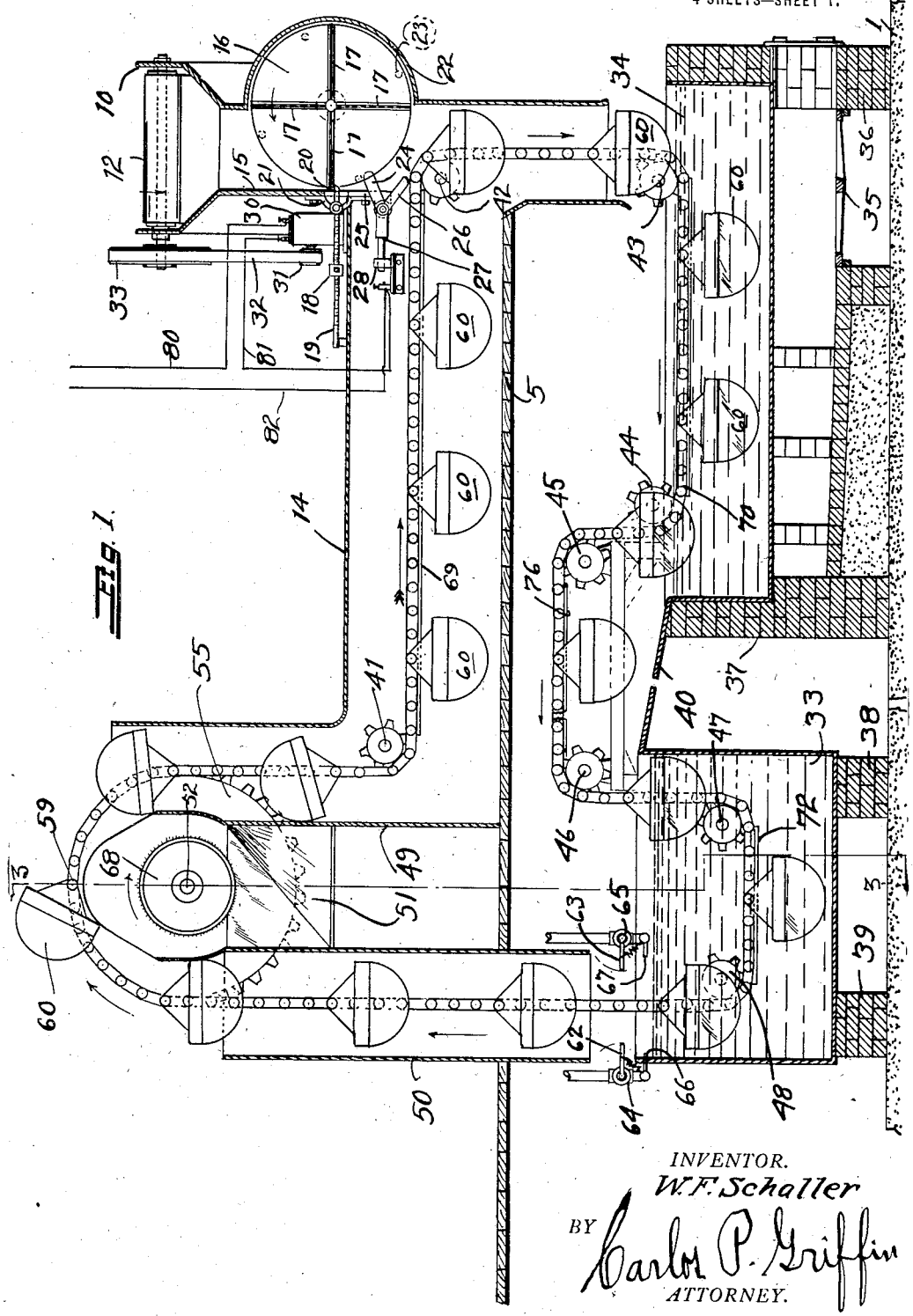
INVENTOR.
W. F. Schaller
BY
Carlos P. Griffin
ATTORNEY.

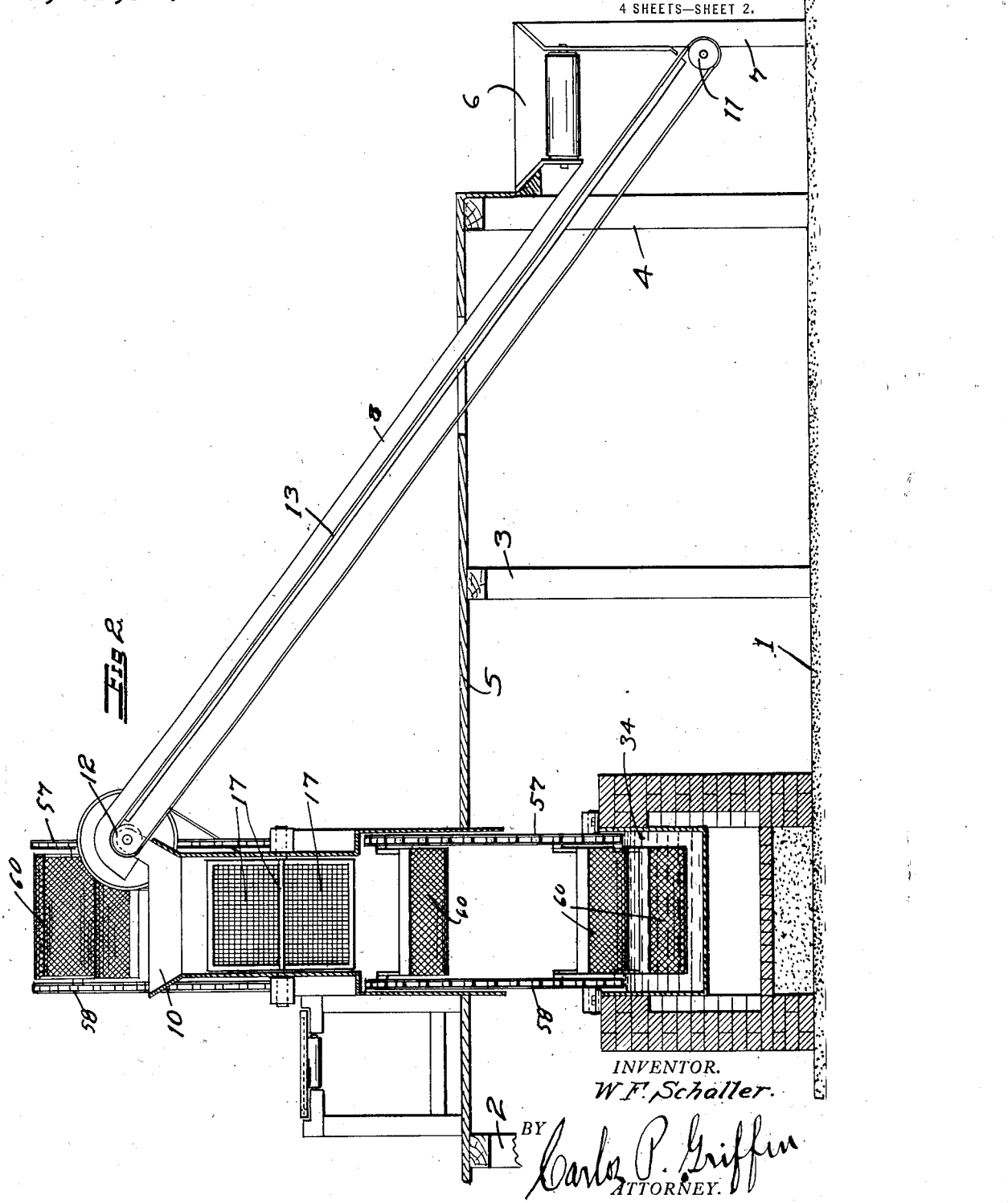

W. F. SCHALLER.
PROCESSING MACHINE FOR FRUITS AND VEGETABLES.
APPLICATION FILED MAR. 13, 1920.
1,381,347.
Patented June 14, 1921.
4 SHEETS—SHEET 3.
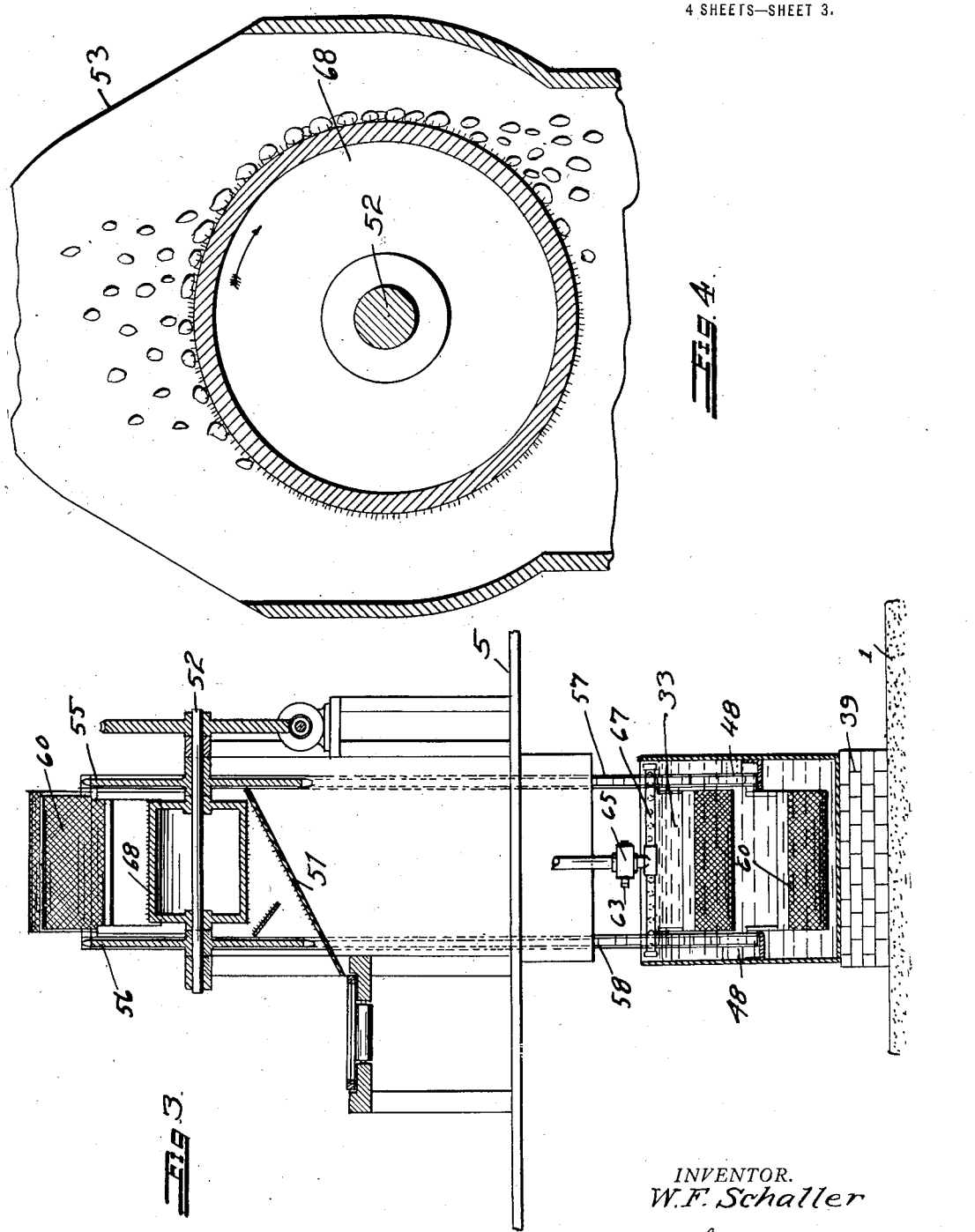
INVENTOR.
W. F. Schaller
BY
Carlos P. Griffin
ATTORNEY.

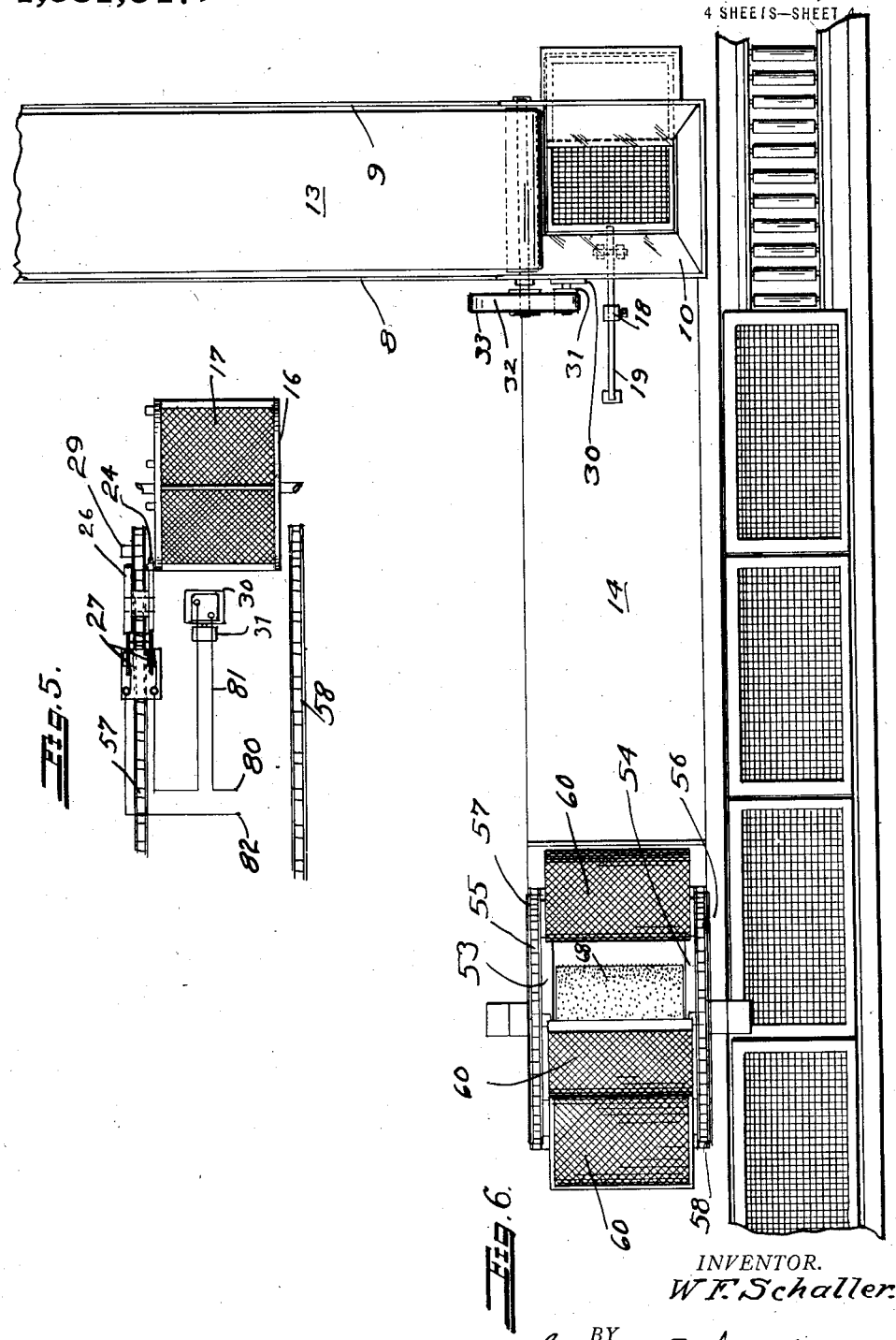

UNITED STATES PATENT OFFICE.

WILLIAM F. SCHALLER, OF SAN FRANCISCO, CALIFORNIA.

PROCESSING-MACHINE FOR FRUITS AND VEGETABLES.

1,381,347.  Specification of Letters Patent.  Patented June 14, 1921.

Application filed March 13, 1920. Serial No. 365,386.

*To all whom it may concern:*

Be it known that I, WILLIAM F. SCHALLER, a citizen of the United States, residing at San Francisco, in the county of San Francisco, State of California, have invented a new and useful Processing-Machine for Fruits and Vegetables, of which the following is a specification in such full and clear terms as will enable those skilled in the art to construct and use the same.

This invention relates to a fruit processing machine in which the fruit is first measured into wire baskets, then dipped in a hot solution of some character, removed from the solution and then dipped in a washing solution and finally dumped out upon a spiked roller which perforates the skin to permit the proper evaporation from the fruit of the water in the fruit juices.

Another object of the invention is to provide a machine which will be semi-automatically supplied with the fruit as the baskets come into place, means being provided to stop the feed of fruit each time the charge of fruit is brought into one of the baskets, and other means being provided to start the feed of the fruit to the measuring apparatus as soon as the empty baskets come into the proper position to receive the fruit from the measuring apparatus.

Other objects of the invention will appear as the description proceeds.

An embodiment of the invention is shown in the accompanying drawings in which the same reference numeral is applied to the same portion throughout but I am aware that there may be modifications thereof.

Figure 1 is a vertical sectional view through the entire apparatus.

Fig. 2 is an end elevation of the entire apparatus, one portion being shown in section.

Fig. 3 is a vertical sectional view of the apparatus on the line 3—3 of Fig. 1.

Fig. 4 is a vertical sectional view of the spiked roller showing the operation of perforating the fruit.

Fig. 5 is a plan view of the measuring wheel.

Fig. 6 is a plan view of the complete machine.

The machine is mounted upon a suitable floor 1 and has such supporting posts 2, 3 and 4 as are necessary to support the platform 5. At one end of the platform there is a hopper 6, supported on a post 7, and also by the post 4, for receiving the fruit and from which inclined elevator sides 8 and 9 extend upwardly to the measuring hopper 10. A roller 11 at the bottom of the hopper 6 and a roller 12 at one edge of the hopper 10 support an endless belt 13, which is used for elevating the fruit from the receiving hopper to the measuring hopper.

The platform 5 supports a housing 14, which extends horizontally over the endless chains forming the fruit carrier and is connected at one end of the rectangular casing 15, which forms the bottom of the hopper 10. Revolubly mounted in the lower portion of the casing 15 is a measuring wheel 16, having four wire blades 17 spaced 90 degrees apart. When the measuring wheel receives the proper charge of fruit, it will over-balance the weight 18 on the lever 19, and will permit the charge of fruit to be dropped from the measuring wheel when it rotates. Normally the measuring wheel rests upon the short end 20 of the lever 19, said lever being pivotally mounted in a bracket 21 adjacent the junction of the body of the casing 14 and one side of the casing 15.

In order to completely house in the measuring wheel, there is a semi-circular casing 22 extending over one-half of said wheel.

The measuring wheel also has four pins 23 extending laterally therefrom adapted to contact with a lever 24, which lever is pivotally mounted in a bracket 25, just below the lever 19.

Rigidly connected with the lever 24 is a similar lever 26 and at the back of the levers 24 and 26 there is rigidly connected thereto an arm 27, which arm serves to electrically connect the switch contacts 28 to close the circuit and start the operation of the motor 30. The motor has pulley 31, and a belt 32 extends therefrom to a pulley 33 on the shaft of the upper elevator drum 12. The chain 57 carries projecting pins 29 which contact with the lever 26 to disconnect the electric circuit as will be later explained.

It will be observed that when the measuring wheel turns 90 degrees that it will disconnect the switch on pins 28 and throw the lever 26 down.

Below the platform 5 there are two solution tanks 33 and 34, the latter having grate bars 35 upon which a fire may be built to heat the solution contained therein.

Suitable walls 36 to 39 inclusive support the tanks and extending between them is an inclined apron 40, which serves to cause all of the solution which is drained off the fruit carrying baskets, to run back into tank 34. Journaled in suitable bearings are a series of shafts and sprocket wheels 41 to 48 inclusive.

At one end of the casing 14 there is a vertical casing 49 and adjacent it is a vertical trunk casing 50. The casings 49 and 50 are connected together by means of an inclined hopper bottom 51 near their upper ends and a shaft 52 is journaled in the upper portion of the sides 53 and 54. The shaft 52 carries two large sprocket wheels 55 and 56, over which the chains 57 and 58 pass. The chains are connected at intervals by rods 59 which rods support the wire baskets 60. The chains pass under the sprocket wheels on the shaft 41, over the sprocket wheels on the shaft 42, under the sprocket wheels on the shafts 43 and 44, over the sprocket wheels on the shafts 45 and 46 and under the sprocket wheels on the shafts 47 and 48 and finally over two large sprocket wheels 55 and 56.

The operation of the apparatus is as follows: Assuming the machine to be started in the condition illustrated in Fig. 1, the switch 28 will be closed to operate the motor 30. This operation will cause the movement of the belt 13 and what fruit has been turned into the hopper 6 will be lifted and dropped into the hopper 10. This operation will continue until a suitable charge of fruit has piled up on one of the wire screen partitions 17 whereupon the wheel 16 will rotate and drop its load of fruit into one of the wire baskets 60.

The weight of the fruit in the basket will cause the entire chain to move and will bring another basket into position in the chute and as it moves into the chute one of the projecting pins 29 will contact with the lever 26 and start the motor 30 again. More fruit will pile up at the nearest partition 17 of the wheel 16 and another load of fruit will be dumped when the weight is sufficient to raise the lever 19.

This operation will be continued until a sufficient number of baskets have been filled to balance the chain as high as the position of the first bucket under the wheel 16 in Fig. 1, thereafter the chain must be moved manually to cause the baskets to be lifted to the discharge position shown at the left hand portion of Fig. 1.

As the buckets pass over the top of the chute 51 they are turned up as illustrated in the left hand portion of Fig. 1 and the fruit is dumped upon the pin roller 68. This roller and the pins in the bottom of the chute 51 perforate the fruit and it is allowed to run out of the chute 51 onto the trays at the side of the machine, which trays are moved along by hand as fast as they are filled.

On the horizontal runs the chains are supported by suitable angle irons 69 to 72 inclusive.

The wiring for the operation of the motor is diagrammatically indicated at 80, 81 and 82, the wires 81 and 82 being connected by means of the contact arm 27.

A chute bottom 51 is also provided with spikes the same as are used on wheel 68, in order to insure perforating all of the fruit.

What I claim is as follows, but various modifications may be made in the construction shown in the drawings and above particularly described, within the purview of my invention.

1. A fruit processing machine comprising the combination of a pair of liquid receptacles, a drain apron extending from one liquid receptacle to the other and a series of fruit holding baskets mounted to travel into one liquid receptacle, out of the same and into the other liquid receptacle, and to thereupon discharge their contents.

2. A fruit processing machine comprising a pair of liquid receptacles, a series of fruit baskets, endless chains for supporting the fruit baskets, means to cause the fruit baskets to travel into and through the liquid receptacles successively and means to perforate the fruit and means to dump the fruit after passing through the liquid receptacles upon the fruit perforating means.

3. A fruit processing machine comprising a measuring apparatus, a plurality of fruit baskets, endless chains supporting the fruit baskets, a pair of liquid receptacles, means to perforate the fruit, means whereby the baskets will be passed through the liquid receptacles successively, to the fruit perforating means and means to dump the baskets of fruit upon the perforating means after it has been removed from the second liquid receptacle.

4. A fruit processing machine, comprising a measuring apparatus, a plurality of fruit baskets, endless chains to carry the fruit baskets successively to a position in the measuring apparatus to receive the charge of fruit, a pair of liquid receptacles, means to cause the fruit baskets to pass successively through both of said liquid receptacles, fruit perforating means and means to dump the baskets of fruit on the perforating means, after the fruit has passed through both of the liquid receptacles.

5. A fruit processing machine, comprising a fruit feeder, a fruit measuring apparatus, a plurality of fruit baskets, endless chains supporting the fruit baskets, means to discontinue the feed when the charge of fruit has been dumped from the measuring apparatus into the adjacent fruit basket, and means to start the feed when a fresh basket approaches a position in which it may receive a charge of fruit.

6. A fruit processing machine comprising a fruit measuring apparatus, a plurality of fruit baskets, endless chains supporting the fruit baskets, a pair of liquid receptacles, means to cause the fruit baskets to move successively through the liquid receptacles, an automatic valve to allow the fruit to be washed as it leaves the second liquid receptacle, fruit perforating means and means to dump the baskets successively upon the fruit perforating means.

7. A fruit processing machine comprising a fruit measuring apparatus, means to feed the fruit thereto, means to stop the feed of the fruit when the measuring apparatus is dumped when charged, movable baskets into which the fruit is dumped, and means to start the feed of fruit when another basket has been brought to a position to receive its charge from the measuring apparatus.

8. A fruit processing machine comprising the combination of the measuring apparatus, a plurality of fruit baskets, a pair of endless chains supporting the said baskets, treating receptacles through which the chains move the endless baskets, automatic valves for spraying the baskets with wash water when they have left the final treating receptacle, a spiked roller for perforating the fruit and means to slowly dump the body of fruit from the basket upon the spiked roller for the perforation thereof.

9. A fruit processing machine comprising a casing having vertical and horizontal trunks and endless chains extending through said casing, a plurality of fruit baskets supported by the endless chains, measuring apparatus to dump a charge of fruit in each basket as the basket passes through one of the vertical trunks, liquid processing receptacles through which the baskets are moved, an automatic valve for washing the baskets and contents, as the baskets leave the last processing receptacle.

In testimony whereof I have hereunto set my hand this 4th day of March, A. D. 1920.

WILLIAM F. SCHALLER.